UNITED STATES PATENT OFFICE.

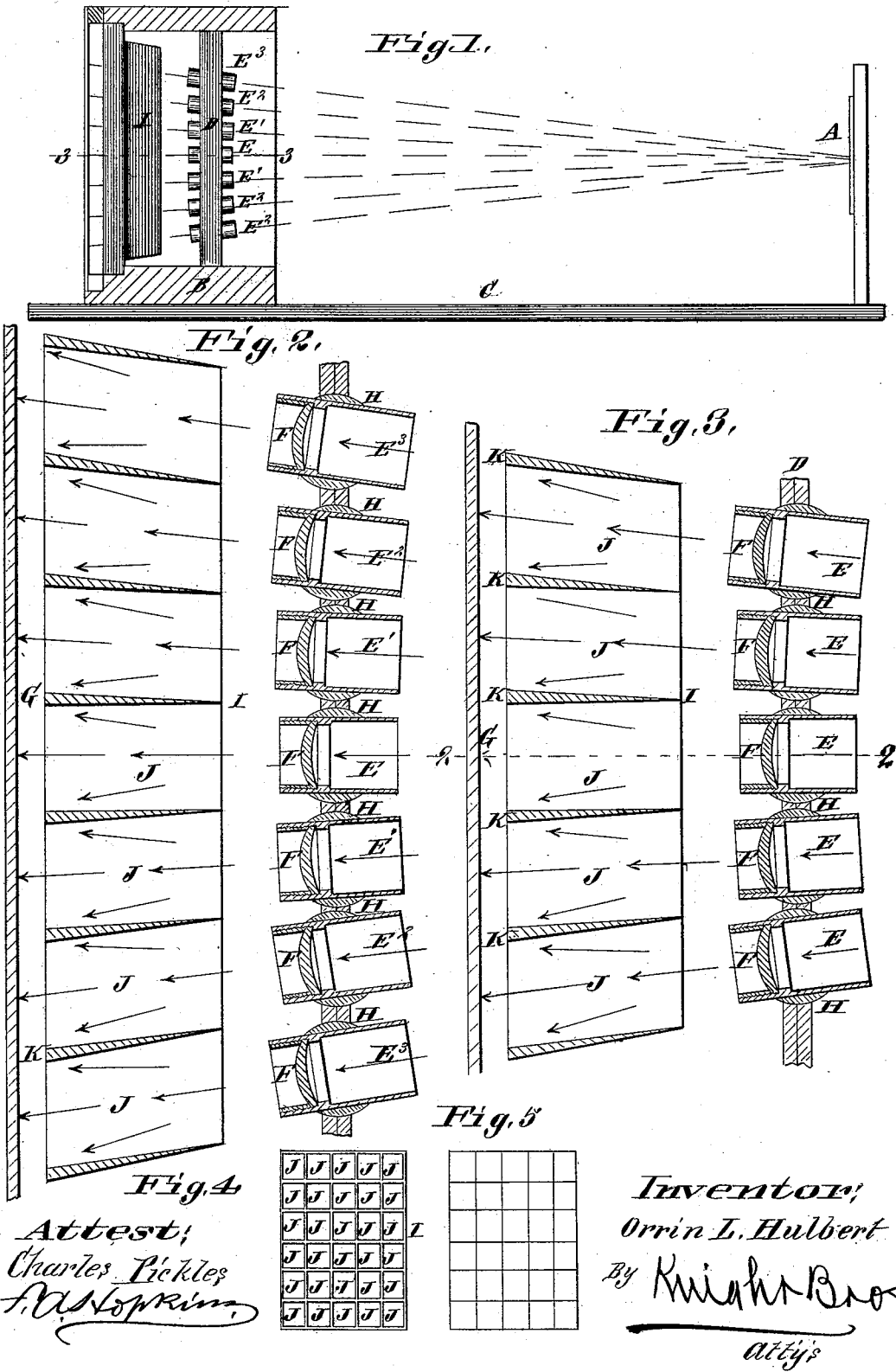

ORRIN L. HULBERT, OF ST. LOUIS, MISSOURI, ASSIGNOR TO HULBERT BROTHERS, OF SAME PLACE.

APPARATUS FOR MAKING MULTIPLE PHOTOGRAPHIC SHEETS.

SPECIFICATION forming part of Letters Patent No. 373,404, dated November 15, 1887.

Application filed December 26, 1885. Serial No. 186,734. (No model.)

*To all whom it may concern:*

Be it known that I, ORRIN L. HULBERT, of the city of St. Louis, in the State of Missouri, have invented a certain new and useful Apparatus for Making Multiple Photograph-Sheets, of which the following is a full, clear, and exact description, reference being had to the accompanying drawings, forming part of this specification, and in which—

Figure 1 is a side view of the apparatus, the box being shown in vertical section. Fig. 2 is a vertical longitudinal section through the box and its contents, taken on line 2 2, Fig. 3. Fig. 3 is a horizontal section through the box and its contents, taken on line 3 3, Fig. 1. Fig. 4 is a reduced view of the shield. Fig. 5 is a view of a blank sheet of photographs.

My invention relates to an improved apparatus for making multiple sheets of photographs—such as is shown, described, and claimed in my application filed June 29, 1885, Serial No. 170,128; and my invention consists in features of novelty hereinafter fully described, and pointed out in the claims.

Referring to the drawings, A represents the picture to be copied, and B represents the box, both box and picture being supported, if desired, on a base-plate, C.

D represents a block having a number of apertures for the lens-tubes E E', each tube being provided with a lens, F, which are shown as concavo-convex, the concave face being presented toward the picture, A, to be reproduced and the convex face toward the negative-plate G, upon which the reduced copies are produced.

The picture A is placed the required distance from the lens-tubes and parallel therewith, and is in such a position that a line extending at right angles from the center lens, E, would pass through the center of the picture. The negative-plate G is also placed in line with the picture A and lens-block D and parallel with them.

The center lens, E, is set with its axis perpendicular to the block D and produces a reduced copy of the picture upon the center of the negative-plate. If the surrounding lenses E' are set parallel with the center lens, E, and nearer to the said lens than the desired distance of the pictures on the plate, then the pictures will not be the required distance asunder on the negative-plate. To correct this the lens-tubes E' are inclined, as shown in Figs. 2 and 3, so that the rays are deflected outward between the lenses or tubes and the negative-plate.

The size of the space occupied by the tubes is smaller than that occupied by the pictures on the sheet of plate, so that it is necessary that the rays of light should diverge less or more between the negative-plate and the lenses, and for this reason the lens-tubes E' are inclined outwardly from the negative, as the deflected rays from the lenses to the picture A are nearly parallel with the rays to the central lens; but as the distance of the lens from the center increases the rays from the picture will be more divergent. Owing to this fact, the second series of lenses, $E^2$, require to be inclined more than the lens-tubes E', and with the outer series of lens-tubes, $E^3$, the divergence of light from the picture being greater than the tubes $E^2$, the latter tubes require to be inclined to a still greater degree.

By means of the described apparatus thirty-five fac-similes are printed at equal distances apart upon a negative-plate at one operation, and from the negative they are printed upon a sheet in the usual manner.

I have placed each lens-tube in a separate collar, H, which is held in the block by a ball-and-socket joint, so as to be capable of turning to allow the tubes to be adjusted to the proper inclination in either direction, so that any irregularities in the lenses can be overcome by adjusting the tubes.

Between the lens-tubes and the negative-plate I place what I term a "shield," I, in line with the lens-tubes, as shown in Figs. 2 and 3. These openings, as stated, are inclined to correspond with the inclination of the lens-tubes, and their office is to form an acute outline for each small picture on the sheet and prevent the light from blending upon the negative-plate and thus form a sheet of small pictures not clearly defined as to their individuality. The space between the openings J is wider at the outer edge of the shield, as shown at K, so as to make a distinct outline upon the negative-plate between each picture.

By moving the shield nearer to or farther from the negative-plate less or more light will fall upon the plate between the pictures, and thus the borders between the pictures may be made more or less, as desired.

I claim as my invention—

1. In combination with a shield having a number of radially-inclined openings, a number of adjustable lenses, substantially as shown, and for the purpose set forth.

2. In a photographic apparatus, the combination, with a shield, of lenses having universal adjustment, substantially as described.

3. In a photographic apparatus, the combination, with a shield, of a number of tubes having lenses, and ball-and-socket connections between the tubes and shield, substantially as described.

ORRIN L. HULBERT.

In presence of—
EDW. S. KNIGHT,
JOE WAHLE.